United States Patent [19]

Dahlquist

[11] 4,351,253

[45] Sep. 28, 1982

[54] TREE PLANTER AND TRAILER

[76] Inventor: E. Arthur Dahlquist, 1404 E. Crystal Lake Rd., Burnsville, Minn. 55337

[21] Appl. No.: 145,671

[22] Filed: May 1, 1980

[51] Int. Cl.$^3$ ............................................. A01G 23/02
[52] U.S. Cl. ........................................ 111/2; 37/2 R; 47/76; 296/3; 414/687
[58] Field of Search ............... 37/2 R; 47/76; 410/31; 414/687; 296/3; 111/2

[56] References Cited

U.S. PATENT DOCUMENTS

| | | | |
|---|---|---|---|
| 1,764,935 | 6/1930 | Davey et al. | 37/2 R |
| 2,541,045 | 2/1951 | Ferwerda et al. | 414/687 |
| 2,769,278 | 11/1956 | Wassell et al. | 37/2 R |
| 3,032,368 | 5/1962 | Sigler et al. | 47/76 X |
| 3,191,982 | 6/1965 | Goalard | 37/2 R X |
| 3,364,601 | 1/1968 | Korenek | 37/2 R |
| 3,558,177 | 1/1977 | Snead | 37/2 R X |
| 3,594,931 | 7/1971 | Yost | 37/2 R |
| 3,713,234 | 1/1973 | Grover et al. | 37/2 R |
| 3,782,773 | 1/1974 | Mason | 296/3 |

FOREIGN PATENT DOCUMENTS 2041208  7/1973  Fed. Rep. of Germany ....... 37/2 R
479462  11/1975  U.S.S.R. ................................. 37/2 R

*Primary Examiner*—Steven A. Bratlie
*Attorney, Agent, or Firm*—Hugh D. Jaeger

[57] ABSTRACT

Tree planter including a truck having a digger mounted to a boom on a hoist on a frame of the truck, and a trailer which can be towed by the truck and including a plurality of cone-shaped containers axially mounted on horizontal pivots. The digger on the boom of the truck includes four hydraulic cylinders for positioning the digger with all degrees of radial and axial freedom with respect to the truck. The digger per se includes six hydraulic cylinders, one hydraulic cylinder for each of four spades and two hydraulic cylinders to open the rear spades around the tree when either digging or planting a tree from either the ground or one of the cone-shaped containers. The trailer can include a plurality of paired cone-shaped containers with the containers being tiltable either singularly or in pairs. While the digger on the truck and the trailer are intended for use in a combination, the digger or the trailer can be used solely independent of each other.

10 Claims, 7 Drawing Figures

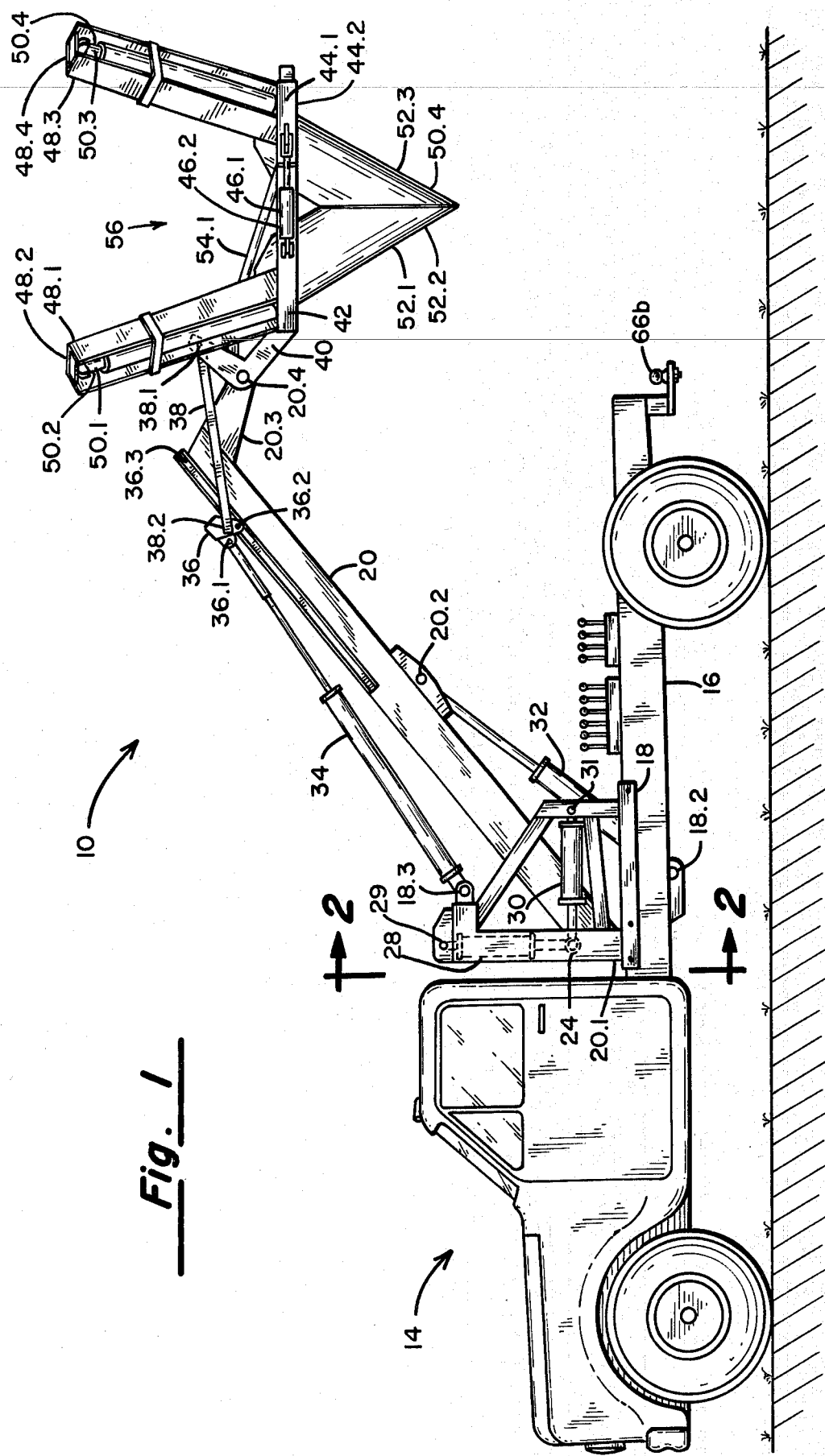

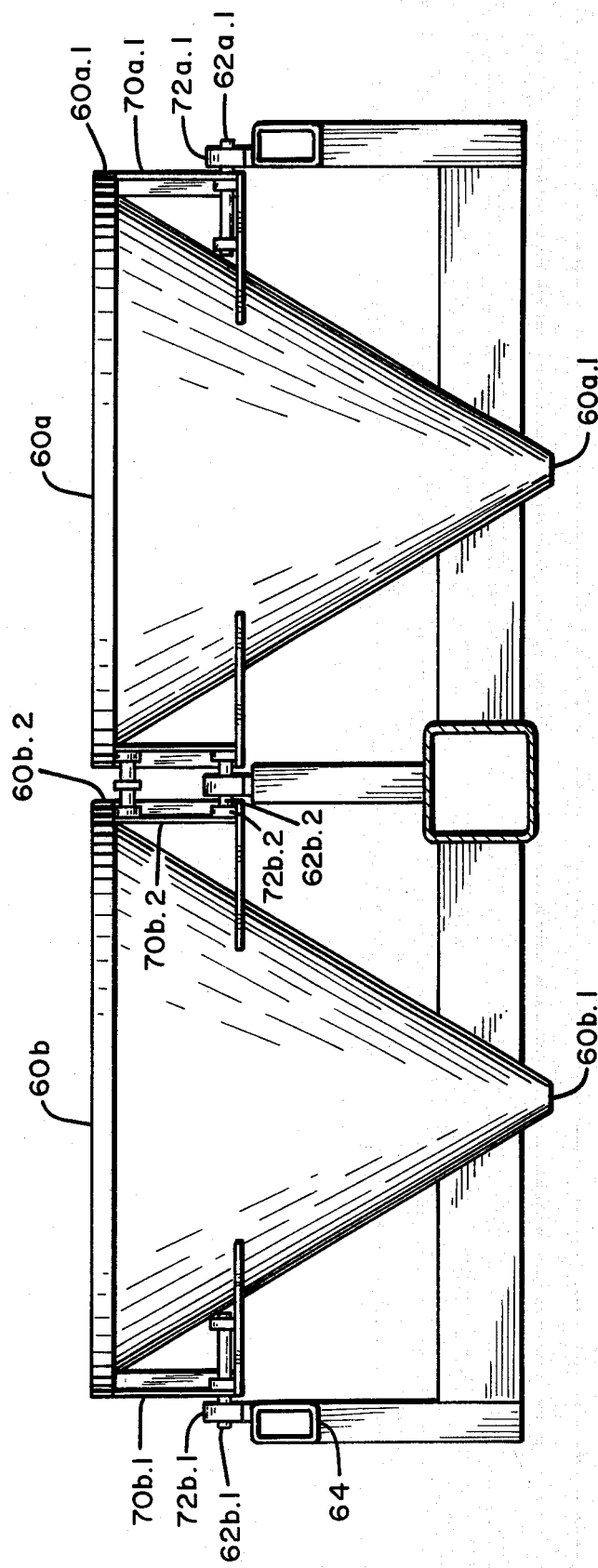

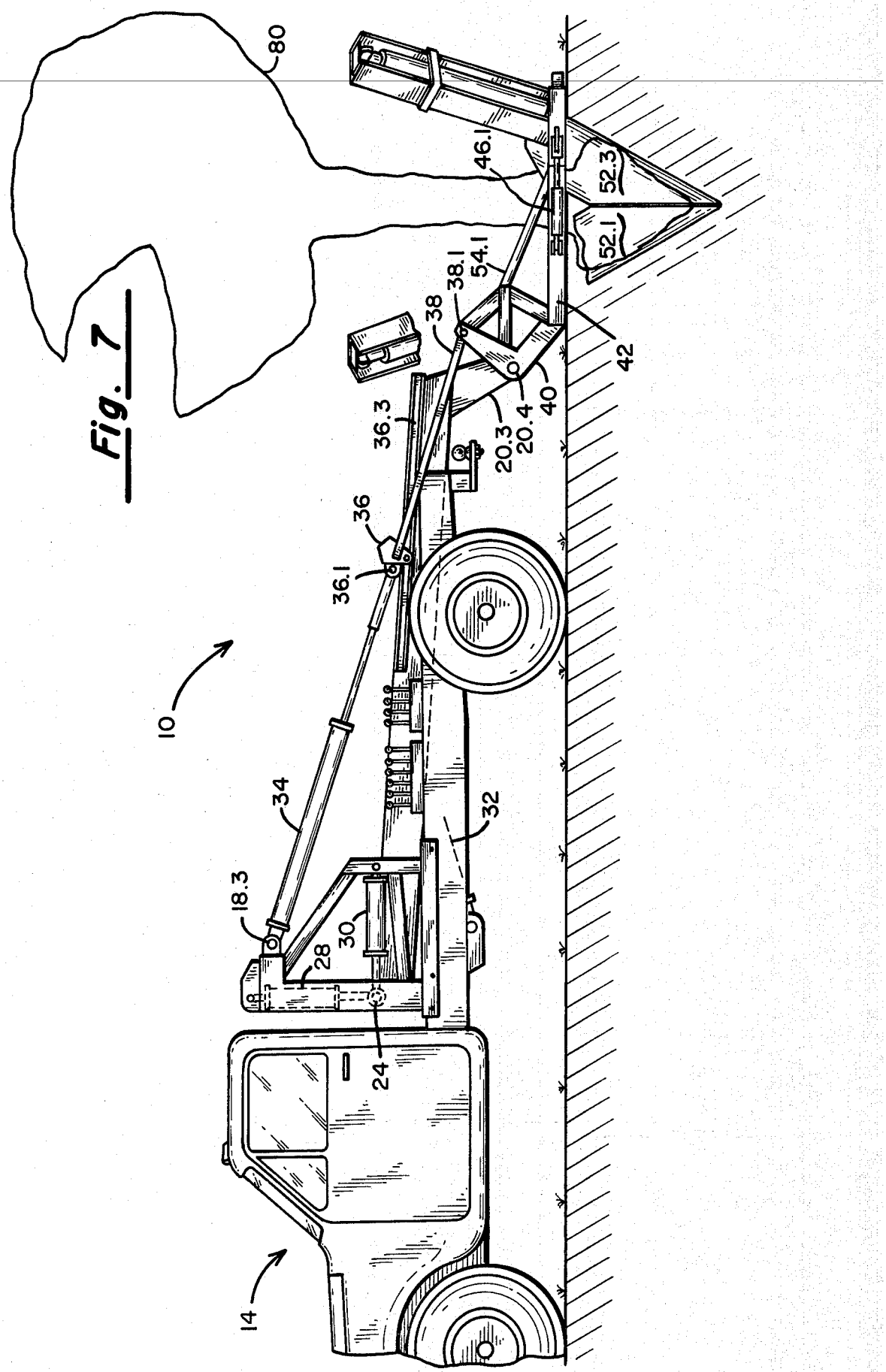

TREE PLANTER AND TRAILER

BACKGROUND OF THE INVENTION

1. Field of the Invention

The present invention pertains to an agricultural implementation for excavating and planting shrubs, trees or other agricultural commodities, and, more importantly, pertains to a tree planter for transplanting trees including the tree and accompanying roots with soil adhering thereto. The tree planter includes a digger including all axial and radial degrees of freedom and a trailer including a plurality of cone-shaped containers for transporting agricultural commodities such as trees.

2. Description of Prior Art

Prior art tree planters have failed to have any versatility such as freedom of movement of the boom including a digger having the four spades and reciprocal gates. The prior art truck-mounted booms have failed to have any versatility in that the boom only tilted around one vertical pivot point with extremely limited height slightly off the ground as actuated by a hydraulic cylinder. The digger including the spades could be moved up and down but failed to provide any axial in or out movement, any radial sideway movement, or any angular movement of the digger blades for positioning the digger including a root ball of agricultural roots such as tree roots with encompassing dirt attached thereto.

To properly position the digger into a pre-dug hole, whether the pre-dug hole was dug by hand, with another device, or with the tree digger itself, it was necessary for the operator of the truck with the digger to back the truck so as to properly position the digger holding the root ball directly aligned above the hole. Then and only then could the digger including the spades as a whole be dropped down into the hole and subsequently brought up individually thereby releasing the tree from the captivity of the spades of the digger.

Another prior art problem of prior art tree diggers was that it was first necessary to dig a hole for the tree or agricultural product before the truck arrived with the agricultural product within the confines of the spades of the digger. Usually this entailed the truck with the tree digger first going out to the location; digging the hole and positioning the dirt from the hole wherever it was convenient such as on another part of the property, or, in the alternative, after the hole was dug the truck would carry the dirt to the nursery or wherever the tree was picked up; then the operator of the truck would excavate the tree or agricultural product from a nursery location; finally, return to the original dug hole; and plant the tree or agricultural product into the hole.

A further particular problem with the prior art tree diggers was that it was only possible to dig and plant one tree at a time, requiring at least one trip if not more commonly two trips to the site of planting of the tree or agricultural product. As the case at hand would always have it, the nursery or point of picking up the tree would always be inconveniently located at a distance from the point of planting of the tree thereby requiring a large expenditure of not only time but also of precious fuel to transverse between the two points. This also resulted in least profits derived due to the lengthy expenditure of time traversing between two points.

Korenek, U.S. Pat. No. 3,364,601, issued Jan. 23, 1968, is illustrative of prior art, especially with respect to the point of minimal degrees of freedom of the digger on the truck.

The prior art tree diggers also failed to lift high enough to load trees or agricultural products onto a trailer in addition to lacking the degrees of freedom. The boom supporting the digger lacked versatility and degrees of freedom on the tree planter thereby preventing use of a trailer with the prior art tree planters, especially a trailer with conical-shaped containers of the present invention.

The present invention overcomes the deficiencies of the prior art by providing a tree planter-digger for trees and agricultural products having all degrees of axial and radial freedom, high lift, and includes a trailer which can be used in combination or solely including a plurality of conical-shaped containers for the transporting of a plurality of agricultural products.

SUMMARY OF THE INVENTION

The general purpose of the present invention is to provide a tree planter including a truck having a tree digger on a boom on the frame of the truck, the tree digger having all degrees of axial and radial movement and freedom about the boom and a trailer which can hitch to the truck and including a plurality of cone-shaped containers pivotal between an upright position and a swing position where the tree digger on the truck can excavate trees or agricultural products, place them in the cone-shaped containers, and the truck including the tree digger pulls the trailer to a site for subsequent transferring of the trees or agricultural products from the trailer and planting them in the ground. The cone-shaped containers can also be utilized to store the dirt removed from the ground during the planting process of the trees or agricultural products from the trailer to the ground.

According to one embodiment of the present invention, there is provided a tree planter including a truck-like vehicle having a hoist frame; an axial hydraulically mounted boom pivotally mounted at one end to the frame; a tree digger pivotally mounted at the other end of the boom and including at least one or more hydraulic actuated spades and two hydraulically actuated gates; a bar linkage connected between the tree planter frame and the boom and a forward-aft tilt hydraulic cylinder connected between the frame and the bar linkage on the boom; and, a boom side swing hydraulic cylinder and a boom machine twist cylinder mounted in a hoist frame of the frame and connected to vertical and horizontal self-aligning bearings whereby the boom hoist cylinder raises and lowers the boom, the forward-aft tilt cylinder controls the aft-forward tilt of the tree digger, the boom side swing cylinder and boom machine twist cylinder control the axial and radial degrees of freedom of the tree digger thereby providing all degrees of axial and radial freedom of the tree digger and the hydraulic cylinders of the spade control the raising and lowering of each blade in addition to the two hydraulic cylinders controlling the opening and closing of the gates of the rear spades of the tree digger. The self-aligning bushings connected to the boom machine twist cylinder and the boom side swing cylinder provide for the alignment of the tree digger with the hole for the planting of the tree.

According to another embodiment of the present invention, there is provided a trailer for pulling behind a vehicle including a plurality of cone-shaped containers mounted thereon, each of the cone-shaped containers being pivotally mounted for a vertical position and an angular rearward facing position during the transporting of trees, the plurality of containers being either individually in line or paired with respect to each other, depending upon the size of the trees and limited in number only by the size of the trailer. In this embodiment, and by way of example and for purposes of illustration only, there is illustrated a trailer having ten cone-shaped containers, paired in groups of two and each of the cone-shaped containers being pivotable between a vertical position and an angular position individually, in pairs, and, most importantly, altogether during transportation of the trees.

While trees have been used as an illustration of one of the intended purposes of the present invention of the tree planter and trailer, either in combination or solely and individually, by way of example and for purposes of illustration only, "tree" is intended to be a generic term and not to be construed as limiting of the present invention. Tree in a generic sense can include any agricultural product such as trees like maple and oak, shrubs, bushes, evergreens, specific grasses or clumps of soil such as zoysia grass, etc.

A significant aspect and feature of the present invention is a tree planting system which allows an operator to move a plurality of trees, and in this embodiment at least nine if it is necessary to pre-dig a hole and store the dirt in an empty container, or eleven trees maximum for the disclosed embodiment, although the disclosed embodiment is not to be construed as limiting of the teachings and principles of the present invention.

Another significant aspect and feature of the present invention is a tree planter mounted on a vehicular truck which is versatile with all degrees of movement, and including all degrees of axial and radial freedom. A boom machine twist cylinder and a boom side swing cylinder connect to the truck mounted end of the boom through self-aligning bushings which can also be described as spherical bushings, self-aligning or spherical bearings. A machine forward-aft and tilt hydraulic cylinder controls the aft and forward movements of the tree digger including a plurality of spades mounted on a spade frame including four actuated hydraulic cylinders actuating four separate independent spades.

A further significant aspect of the present invention is a trailer for carrying a plurality of trees which includes a plurality of cone-shaped containers which are mounted on horizontal pivots. During excavating and depositing of the trees in the cone-shaped containers or removal and planting of the trees in the ground, each respective cone-shaped container is vertical with respect to the ground but during transportation of the plurality of trees, as deemed necessary and predetermined, the cone-shaped containers pivot at an angle with respect to the ground within the range of 30° to 60°. The containers can pivot individually, pivot together in a group, or pivot in pairs. In the particular embodiment disclosed, the containers would pivot individually with respect to each other, but can also pivot in pairs. During the removal of trees from the trailer and planting, the trailer is unhooked from the truck and the tree planter on the truck is either pivoted with the hydraulic cylinder structure on the truck or the truck is driven and moved into position, depending upon the particular container. The containers can also be used to store dirt from dug holes which can later be deposited at a landfill or dumpsite by mechanically tilting each container and thereupon dumping the dirt on the ground.

Having thus described embodiments of the present invention, it is the principal object hereof to provide a tree planting system, or, more importantly, a tree planter mounted on a vehicle frame and including a trailer for use with the tree planter to transport a plurality of trees, although the tree planter and trailer can either be used in a combination or solely and exclusively of each other.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 illustrates a side view of the boom supported tree digger on a truck;

FIG. 6 illustrates a sectional view taken along line 6—6 of FIG. 4; and,

FIG. 7 illustrates the geometrical relationships of the structural elements during the planting of a tree into the ground.

DESCRIPTION OF PREFERRED EMBODIMENTS

Figure 3:
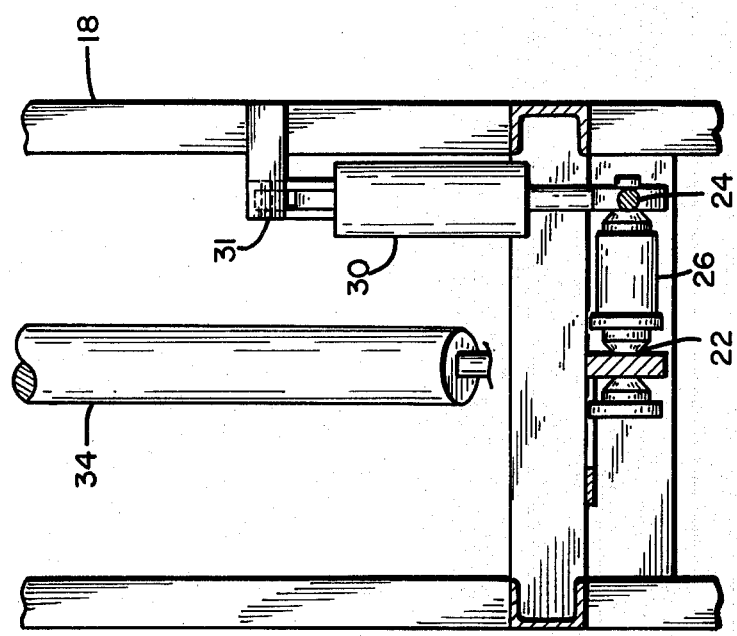
FIG. 3 illustrates a top view of FIG. 1.
Figure 2:
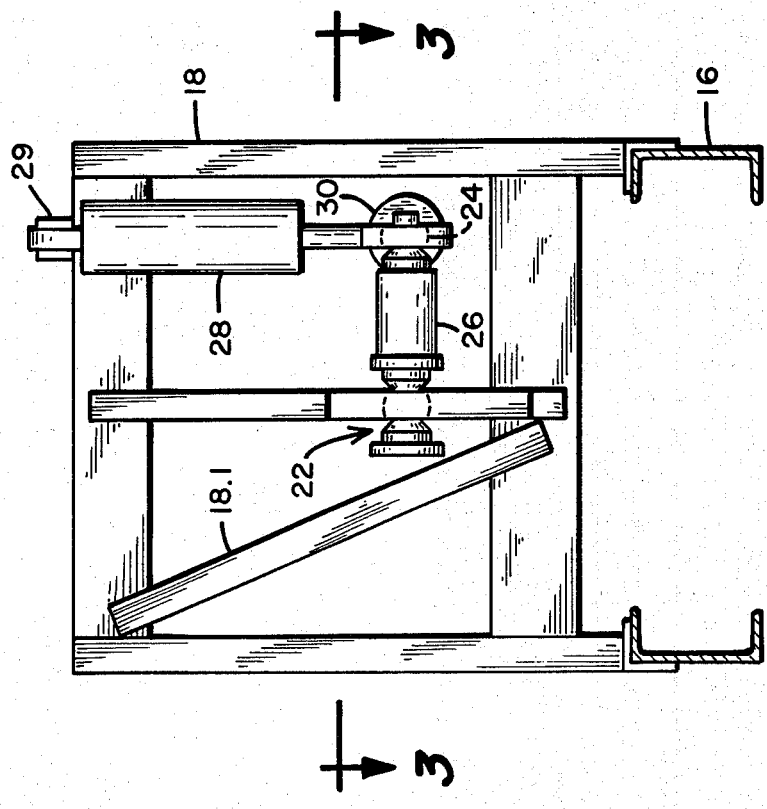
FIG. 2 illustrates a sectional view taken along line 2—2 of FIG. 1.
Figures 4, 5:
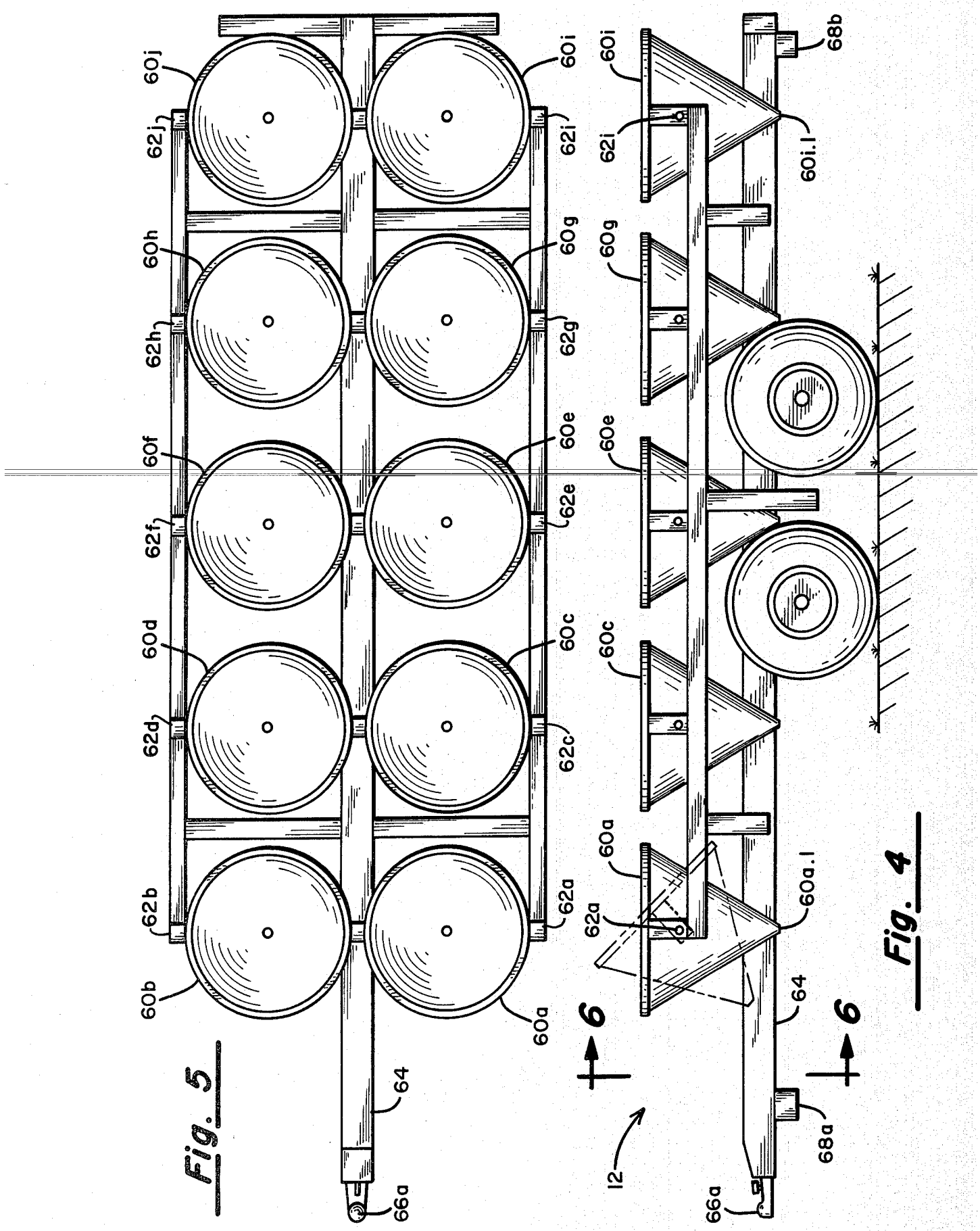
FIG. 4 illustrates a side view of a tree transporting trailer.
FIG. 5 illustrates a top view of the tree transporting trailer.

FIG. 1, which illustrates a side view of the present invention, shows a tree planter 10 as now described in detail and a trailer 12 in FIG. 4 which can hitch to a truck 14. The tree planter 10 includes the truck 14 having the usual vehicle components of wheels, engine, transmission and a hydraulic system, and including a longitudinal chassis frame 16 which supports the vehicular components. Hoist frame 18 secures and bolts to the chassis 16, and supports a boom 20 secured at one end 20.1 to a first self-aligning bushing 22 as illustrated in FIGS. 2 and 3. Bar linkage 26, as illustrated in FIGS. 2 and 3, connects the first self-aligned bushing 22 to a second self-aligned bushing 24 as illustrated in FIG. 1 which connects to boom machine twist hydraulic cylinder 28 and boom side swing hydraulic cylinder 30 where the other ends of the hydraulic cylinders pivotally connect to the hoist frame 18 through self-aligning bushings 29 and 31. Boom hoist hydraulic cylinder 32 pivotally connects between the bottom of the hoist frame self-aligning bushing 18.2 to a mid-pivot point self-aligning bushing 20.2 on the boom. Machine forward-aft tilt hydraulic cylinder 34 connects between a pivot point self-aligning bushing 18.3 on the hoist frame 18 and a movable pivot 36 including pivot point self-aligning bushing 36.1, opposing wheels 36.2 which ride in a rail track 36.3 on both sides the boom 20. A bar linkage 38 connects to a pivot point 38.1 at one end and affixes to the pivot member 36 at the other end. Boom hook 20.3 extends downward and outwardly from the end of boom 20 and includes a pivot point 20.4 about which cross member 40 pivots at 20.4 as actuated at pivot point.

A tree digger 56 as now described includes elements 40–54 and connects to pivot point 20.4 and bar linkage 38 as now described. Rectangular spade frame 42 includes opposing gates 44.1 and 44.2 illustrated in dashed line as being positioned directly behind 44.1 as a mirror image thereof and of like identical mechanical and hydraulic structure which engages with each other and are actuated by hydraulic gate cylinders 46.1 and 46.2. Slidable channels 48.1 through 48.4 as also illustrated are located on the four corners of spade frame 42. The channels 48 respectively include hydraulic cylinders 50.1–50.4 as also illustrated connected between the frame 42 and the respective slidable channels 48 for actuating up and down spades 52.1–52.4 connected to each of the respective channels 48 and as also illustrated. Bar members 54.1 and 54.2 connect between the spade frame 42 and the cross 40 and provide for support.

FIG. 2 illustrates a sectional view taken along line 2—2 of FIG. 1 where all numerals correspond to those elements previously described, and particularly shows the bar linkage 26, the boom machine twist cylinder 28 and the self-aligning bearings 22 and 24.

FIG. 3 illustrates a top view and particularly shows the boom side swing cylinder 30, the self-aligning bushings 22 and 24, and the tree digger 56 of FIG. 1 not illustrated. All other numerals correspond to those elements previously described.

FIG. 4, which illustrates a side view of the trailer 12, shows a plurality of cone-shaped containers 60a–60j which number is not to be construed as limiting of the present invention and as by way of example and for purposes of illustration only, as also illustrated in FIG. 5 aligned in paired relationship with respect to each other and with respect to all the other cone containers 60. The trailer 12 includes the plurality of cone-shaped containers 60a–60j axially mounted on horizontal pivots 62a–62j as also illustrated in FIG. 5 to the frame 64 of the trailer 12 which includes at least one, and as illustrated in this example, two wheel axles including wheels. The trailer includes a trailer hitch 66a at the forward end of frame 64 which hitches onto a truck hitch 66b in FIG. 1. The cone-shaped containers 60a through 60j include truncated bottoms 60a.1 through 60j.1 providing for passage and escapage of loose dirt and moisture. The cone containers can pivot either individually such as 60a locked into position by any known restraining means within the art as illustrated in imaginary lines or can include bar linkages for pivoting in pairs such as 60a and 60b together. Forward and rear jacks, not illustrated in the figure, engage into the forward and rear jack holders 68a and 68b for jacking and restraining the trailer in a horizontal position during loading and unloading of trees from the cone.

FIG. 5 illustrates a top view of the trailer 12 where all numerals correspond in those elements previously described.

FIG. 6, which illustrates a sectional view taken along line 6—6 of FIG. 4, shows two paired cone-shaped containers 60a and 60b axially mountd on horizontal pivots 62a and 62b by way of example and for purposes of illustration only to the frame 64 of the trailer as now described in detail. Each container includes opposing support right angle linkages 70b.1 and 70b.2 affixed between a top reinforced edge 60b.2 of the container 60b, to the horizontal pivot 62b.1 and 62b.2, and to an upper middle portion of the container 60b. The points 62b.1 and 62b.2 include bearings 72b.1 and 72b.2 secured to the frame 64 of the trailer 62. Other frame 64 structure is illustrated in the figure for supporting the cone-shaped containers 60.

PREFERRED MODE OF OPERATION

The tree planting system of the present invention provides that one or more operators can move at least nine or up to eleven trees in the disclosed embodiment at one single time, not only saving energy but also saving time. Tree planting system includes the tree planter 10 on truck 14 of FIG. 1 having the tree digger 56 of structure elements 40–54 mounted to the boom including members 20–38 and the trailer 12 of FIG. 4 in tow behind the truck 14 including the ten cone-shaped containers 60a through 60j axially mounted on horizontal pivots 62a–62j. During transportation of the trees, the cone-shaped containers 60 are tilted as required, usually at a 45° angle, and can accommodate trees in the size of ten-foot high by six-foot wide by way of example and for purposes of illustration when tilted at a 45° angle allowing for clearance of overhead structures such as bridges, power lines, traffic signals, etc.

When an operator arrives at a tree farm or similar site, the operator will lower two jacks (not illustrated in the figure) in jack holders 68a and 68b of the trailer 12, and unhook the trailer 12 from the truck 14. The operator subsequently excavates trees from the ground and fills as many cones as are available, usually nine in number, which allows for the empty tenth cone for accommodating dirt from a first hole when dug by the digger at the first planting site.

The tree digger including structural members 38 through 54 on the truck 14 can be lowered, raised, axially tilted and even angularly twisted for quick and easy positioning about each tree during the excavation-digging process from the ground and the depositing process of the tree into the cone-shaped containers 60 through control of the hydraulic cylinders 28–34.

Excavating a tree is a self-explanatory procedure in light of the disclosure of FIGS. 1–6 and will not be explained in detail.

After a tree has been excavated and deposited in one of the cone-shaped containers, the spades 52.1–52.4 are pulled back into each respective channel leaving the tree with its root system and encompassing dirt deposited in the respective cone-shaped container. Once all of the cones 60 are filled with trees, the tree digger 56 is raised high into a position to clear the trailer 12, and the trailer 12 is then hitched to the truck 14 and pulled to the planting site.

Upon reaching the planting site, the operator again unhitches the trailer 12, digs a hole for the first tree and puts the dirt in the one empty cone-shaped container 60. It is to be noted that if the holes are pre-dug or there is no need to carry away the dirt, the tree planting system including the tree digger 56 on the truck 14 and trailer 12 can transport a maximum of eleven trees in the disclosed embodiment. The operator now places the tree digger with spades 52.1–52.4 raised on the top of a cone-shaped container 60 containing the first tree. The spades 52.1–52.4 are then lowered inside the container 60 where the tree 80 is picked up and then planted into the ground as illustrated in FIG. 7.

The operator has hydraulic control versatility of the tree digger 56 with axial movement of the hydraulic cylinders 28–34 for not only axial but also radial movement of the tree digger 56, one of the most important novel aspects and significant features of the present invention. When planting a tree 80, the tree digger 56 on the truck 14 would assume the likely position as illustrated in FIG. 7. Once a tree 80 is planted, a hole is dug for the next tree and the dirt placed in the container 60 from which the previous tree was removed. When all the trees are removed from the containers 60 and planted, the trailer 12 carrying all of the dirt from nine of its ten cones can be pulled to a depositing site for quick dumping of the dirt or to fill the holes from where the trees were dug from.

FIG. 7 illustrates the geometrical relationships of the structural elements of the boom elements 20-38 and tree digger elements 40-56 during the planting of the tree 80 into the ground. Specifically, the spade frame 42 is substantially parallel to and substantially touching the surface of the ground during planting and withdrawal of the spades 52.1-52.4.

Various modifications can be made to the tree digger 56 and boom 20 of the present invention without departing from the apparent scope thereof. For instance, the boom machine twist and boom side swing cylinders are not required for axial movement with slight modification to the hoist frame but are required for axial and radial movement. While the trailer 12 with the cone-shaped containers 60.a through 60.j has been illustrated as ten in number, any smaller or larger number can be utilized and is only limited by the size of the trailer and the size of the cone-shaped containers.

Having described the present invention, what is claimed is:

1. Tree planting system for excavating, transporting and planting a plurality of trees or shrubs, said tree planting system comprising:
   a. vehicular tree planting means including a frame, an engine mounted on said frame, two axles of wheels axially mounted on said frame, a transmission for one of said axles, said engine connected through said transmission to one axle of said wheels, hydraulic power means for providing pressure of hydraulic fluid connected to said engine, and hydraulic control means connected to said hydraulic power means for controlling hydraulic pressure, hoist frame means affixed to said frame, hoist frame means including a longitudinal boom including a rectangular cross section affixed at one end to a self-aligning bushing secured and positioned in a bottom position of said hoist frame means, a boom hoist hydraulic cylinder pivotally connected between said hoist frame means and a lower mid portion of said boom with self-aligning bushings at each end thereof, a forward-aft tilt hydraulic cylinder connected between said hoist frame means and a movable pivot point means at an other end of said boom on an upper portion of said boom with self-aligning bushings at each end, said pivot point means riding on opposing wheels on opposing rails positioned on, at and over a portion of said other end of said boom, a boom twist machine hydraulic cylinder and a boom sideswing hydraulic cylinder for providing vertical and horizontal motion to said boom respectively, said boom machine and sideswing cylinders connected by a bar linkage means between said hoist frame means and to said boom with self-aligning bushings between said linkage, said boom and said frame means, a digger frame means pivotally mounted to said other end of said boom and connected to said movable pivot point means by a bar linkage, said digger frame means including four hydraulic spade cylinders, actuated spades spaced about said digger frame means and connected to said spade cylinders and two hydraulic gate cylinders connected between said digger frame means and gates positioned in said digger frame means and connected to said two cylinders for opening and closing said gates about a tree, said hydraulic cylinders of said boom, said forward-aft, said boom twist machine, said boom sideswing, said spade cylinders and said gate cylinders connected to said hydraulic control means for individual actuation of each cylinder by said hydraulic control means; and,
   b. trailer including a longitudinal frame means, said frame means including tandem axially mounted wheels thereto, said trailer frame means pivotally coupled to said vehicular tree planter means, a plurality of cone-shaped continuous wall containers, each bottom of said containers truncated, each of said containers pivotally mounted on bearing means with horizontal bearing axes affixed to said trailer frame means for movement between a substantially vertical position to a substantially angular position when said vehicle means and said trailer are in vehicular motion, means on said trailer frame means for locking each of said containers into said angular position, said trailer including forward and rearward positioning support jacks respectively connected to said frame means whereby said spades excavate said trees and deposit said trees into said truncated cone-shaped containers, said means for locking said cone-shaped containers into said angular position during vehicular transport of said trees in said containers said trailer being disconnected from said vehicular tree planting means and supported in a fixed position by said jacks during removal of a tree from one of said cone-shaped containers during removal and planting in ground, and said boom being raisable and movable to a height for depositing and removing said tree from above a top height of one of said truncated cone-shaped containers, said continuous wall of each container provides for securing the root ball of each tree and said truncated bottom provides an opening for drainage of water and dirt particles thereby providing transportation for a plurality of mature trees in said trailer by said vehicular tree planting means.

2. System of claim 1 wherein said plurality of containers comprise ten, two parallel rows of five containers each.

3. System of claim 1 wherein said plurality of containers comprising four.

4. System of claim 1 wherein said plurality of containers comprise twenty-four, three parallel rows of eight containers each.

5. System of claim 1 wherein each of said cone-shaped containers includes a top reinforcing rectangular rim member around a circumferential edge of each of said containers.

6. System of claim 1 wherein said boom of said vehicular tree planting means is movable in all degrees of freedom of radial and axial movement.

7. System of claim 1 wherein said spades provide for excavating a tree, depositing said tree in any of said containers, removing said tree from said container, and replanting said tree in said ground.

8. System of claim 1 wherein said vehicular tree planting means includes a forward axle and a rearward axle.

9. System of claim 1 wherein said hydraulic control means includes a separate center position hydraulic valve connected in each hydraulic cylinder control line.

10. System of claim 1 wherein said hydraulic control means is positioned adjacent said hoist frame means on driver's side of said frame.

* * * * *